United States Patent
Ichikawa et al.

(10) Patent No.: US 11,647,814 B2
(45) Date of Patent: May 16, 2023

(54) MARKERLESS FOOT SIZE ESTIMATION DEVICE, MARKERLESS FOOT SIZE ESTIMATION METHOD, AND MARKERLESS FOOT SIZE ESTIMATION PROGRAM

(71) Applicant: ASICS CORPORATION, Kobe (JP)

(72) Inventors: Masaru Ichikawa, Kobe (JP); Hiroyuki Kusumi, Kobe (JP); Kazunari Takeichi, Kobe (JP)

(73) Assignee: ASICS CORPORATION, Kobe (JP)

( * ) Notice: Subject to any disclaimer, the term of this patent is extended or adjusted under 35 U.S.C. 154(b) by 154 days.

(21) Appl. No.: 17/255,967

(22) PCT Filed: Jun. 26, 2019

(86) PCT No.: PCT/JP2019/025388
§ 371 (c)(1),
(2) Date: Dec. 23, 2020

(87) PCT Pub. No.: WO2020/261434
PCT Pub. Date: Dec. 30, 2020

(65) Prior Publication Data
US 2021/0267315 A1    Sep. 2, 2021

(51) Int. Cl.
*A43D 1/02* (2006.01)
*G06N 20/00* (2019.01)
*A43D 1/06* (2006.01)

(52) U.S. Cl.
CPC .................. *A43D 1/02* (2013.01); *A43D 1/06* (2013.01); *G06N 20/00* (2019.01)

(58) Field of Classification Search
CPC ........ A43D 1/02; A43D 1/06; A43D 2200/00; A43D 2200/60; A43D 1/027; A43D 1/08; A43D 1/025; G06N 20/00
See application file for complete search history.

(56) References Cited

U.S. PATENT DOCUMENTS

| 2001/0020222 A1 | 9/2001 | Lee et al. |
| 2005/0049816 A1 | 3/2005 | Oda et al. |
| 2011/0109621 A1 | 5/2011 | Schoenfeld |

FOREIGN PATENT DOCUMENTS

| JP | 2001-104005 A | 4/2001 |
| JP | 2004-305374 A | 11/2004 |

(Continued)

OTHER PUBLICATIONS

The extended European search report issued by the European Patent Office on Jan. 5, 2022, which corresponds to European Patent Application No. 19933203.2-1005 and is related to U.S. Appl. No. 17/255,967.

(Continued)

*Primary Examiner* — Roy Y Yi
*Assistant Examiner* — Geoffrey T Evans
(74) *Attorney, Agent, or Firm* — Studebaker & Brackett PC

(57) ABSTRACT

In a markerless foot size estimation device 100, a shape data input unit 10 acquires three-dimensional shape data of a foot of a subject and stores the three-dimensional shape data in a shape data storage unit 20. A characteristic extraction unit 30 extracts foot shape characteristics from the three-dimensional shape data of a subject's foot stored in the shape data storage unit 20, and stores the foot shape characteristics in a shape characteristic storage unit 40. A machine learning unit 50 uses, as teacher data, foot shape characteristics and arch height stored in the shape characteristic storage unit 40 to create, through machine learning, an estimation model used to estimate arch height based on foot shape characteristics, and stores the estimation model in an estimation model storage unit 60. An estimation output unit 70 uses the estimation model stored in the estimation model storage unit (Continued)

60 to estimate arch height based on extracted shape characteristics and outputs the arch height.

5 Claims, 7 Drawing Sheets

(56) References Cited

FOREIGN PATENT DOCUMENTS

| JP | 3214280 U | 12/2017 |
| WO | 2005/006905 A1 | 1/2005 |
| WO | 2014/176672 A1 | 11/2014 |

OTHER PUBLICATIONS

International Search Report issued in PCT/JP2019/025388; dated Sep. 17, 2019.
Atsushi Oda et al. "Relationship Between the Quantification of Evaluation by Footprint and Foot Arch Height Ratio" Study on the Establishment of Standard Value of Foot Arch Height in Healthy Adults, Mar. 2008, pp. 1-5.

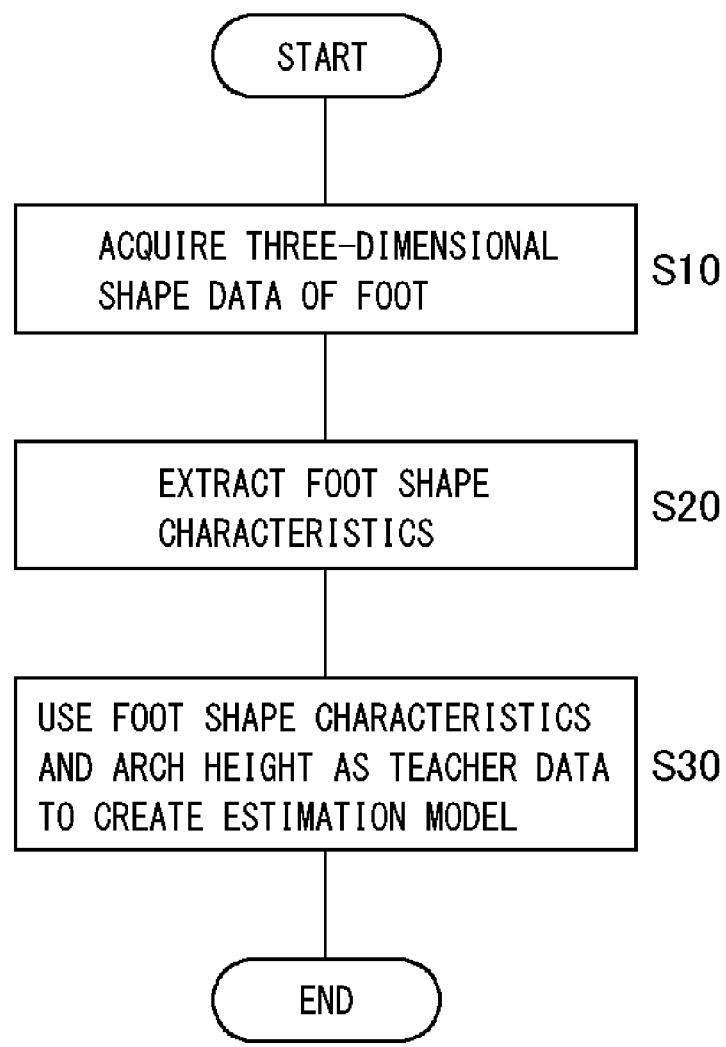

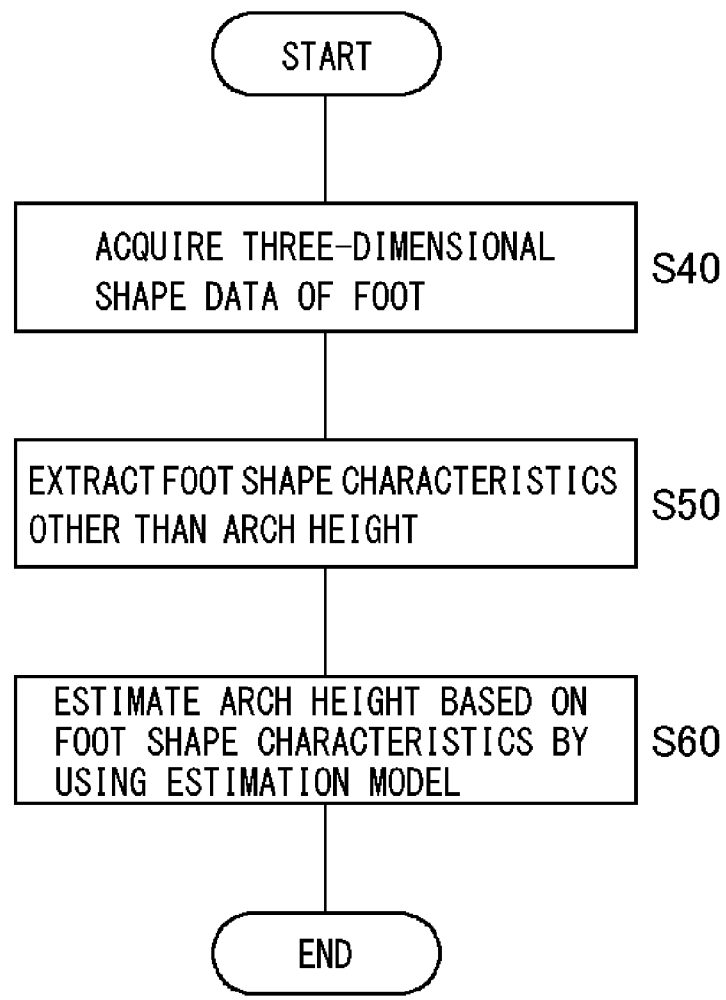

MARKERLESS FOOT SIZE ESTIMATION DEVICE, MARKERLESS FOOT SIZE ESTIMATION METHOD, AND MARKERLESS FOOT SIZE ESTIMATION PROGRAM

TECHNICAL FIELD

The present invention relates to a technology for estimating arch height.

BACKGROUND ART

Shoe stores provide services for customers, such as measuring a customer's foot shape using a foot shape measuring instrument to select and recommend shoes optimal for the customer's foot shape from among ready-made shoes, or to receive an order for making custom-made shoes that fit the customer's foot shape.

For example, Patent Literature 1 discloses a shoe selection assisting system that measures a state of a foot of a person to be measured and estimates anatomical characteristics of the foot to select and present a shoe type that suits the person to be measured.

Patent Literature 2 discloses a foot inclination angle measuring method used to measure an angle of inward/outward inclination of a foot in order to select or manufacture shoes or shoe sock liners suitable for the feet of a customer.

PRIOR ART REFERENCE

Patent Literature

Patent Literature 1: WO 2005/006905
Patent Literature 2: Japanese Unexamined Patent Application Publication No. 2004-305374

SUMMARY OF INVENTION

Technical Problem

Patent Literature 1 discloses a technology in which navicular tuberosity height of a foot of a person to be measured is obtained, with markers attached to positions based on which dimensions representing characteristics of the foot of the person to be measured are measured.

Patent Literature 2 discloses a technology in which, for accurate measurement, a mark is put on the most outwardly bulging part of the navicular bone of a foot before the arch height rate of the foot is calculated.

Thus, in the measurement method described in Patent Literature 1 or 2, a measurer needs to grope for the position of the navicular head to attach a marker thereto, which requires time and effort for the operation. Also, the measurer needs to have practice to accurately identify the position of the navicular head. Accordingly, a human error is likely to occur, and differences in accuracy of the marker's position may cause a measurement error.

The present invention has been made in view of such a problem, and a purpose thereof is to provide a markerless foot size estimation technology for accurately estimating arch height without using markers.

Solution to Problem

To solve the problem above, a markerless foot size estimation device of one aspect of the present invention includes: an extraction unit that extracts shape characteristics of a foot from three-dimensional shape data of a foot of a subject; and an output unit that estimates, using an estimation model obtained through machine learning using as teacher data the shape characteristics and arch height of the foot of the subject, the arch height based on the extracted shape characteristics and outputs the arch height.

Another aspect of the present invention relates to a markerless foot size estimation method. The method includes: extracting shape characteristics of a foot from three-dimensional shape data of a foot of a subject; and estimating, using an estimation model obtained through machine learning using as teacher data the shape characteristics and arch height of the foot of the subject, the arch height based on the extracted shape characteristics and outputting the arch height.

Optional combinations of the aforementioned constituting elements, and implementation of the present invention in the form of methods, apparatuses, systems, computer programs, data structures, and recording media may also be practiced as additional modes of the present invention.

Advantageous Effects of Invention

The present invention enables accurate estimation of arch height without using markers.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 4 is a flowchart that shows a procedure for creating an estimation model used to estimate arch height based on foot shape characteristics; and FIG. 5 is a flowchart that shows a procedure for estimating arch height based on extracted foot shape characteristics by using an estimation model.

DESCRIPTION OF EMBODIMENTS

Figure 1:
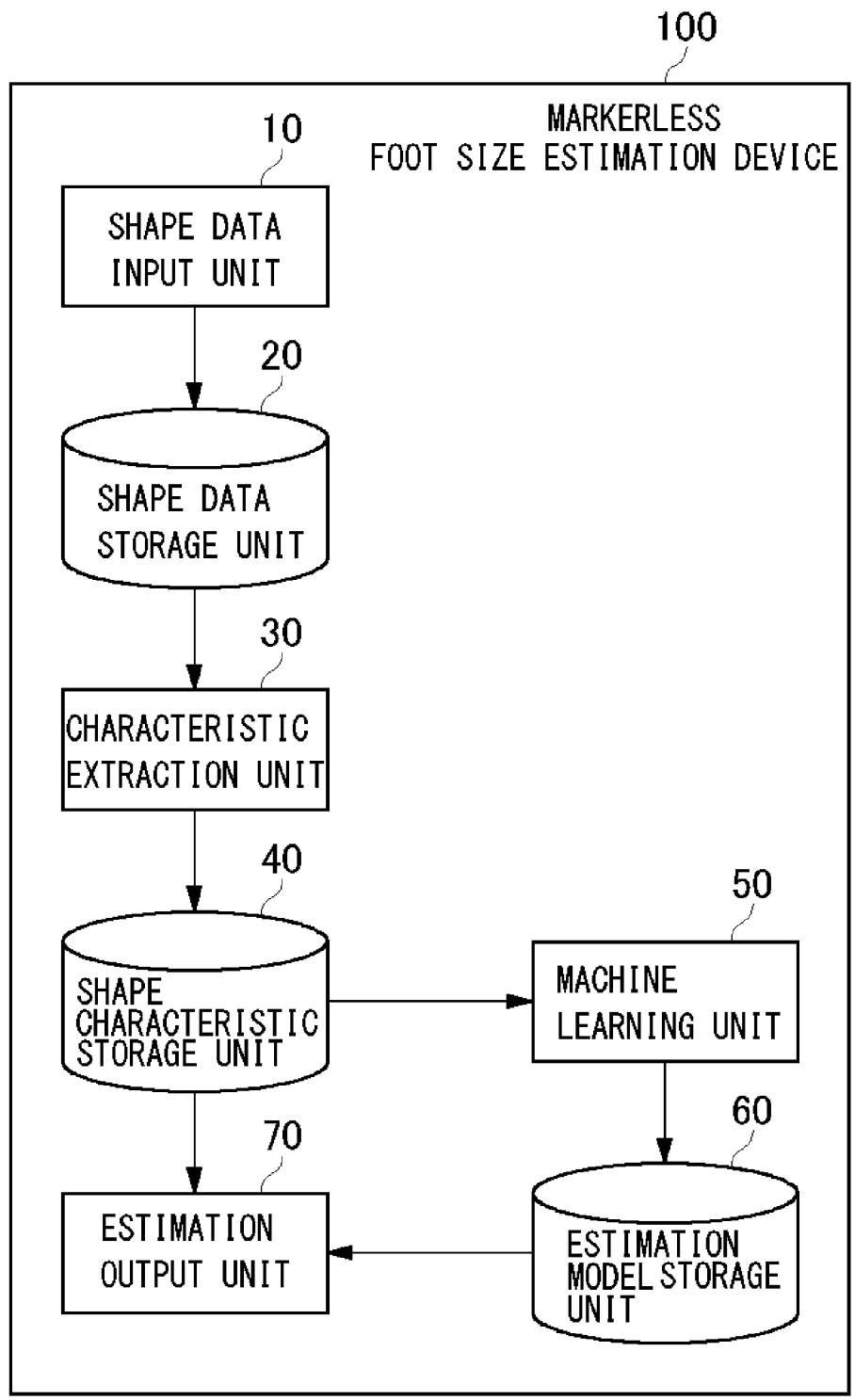
FIG. 1 is a configuration diagram of a markerless foot size estimation device of the present embodiment.

FIG. 1 is a configuration diagram of a markerless foot size estimation device 100 of the present embodiment. FIG. 1 is a block diagram featuring the functions, and these functional blocks may be implemented in a variety of forms by hardware, software, or a combination thereof.

A three-dimensional shape of a foot of a subject may be measured by means of a foot shape measuring instrument provided with a three-dimensional scanning function, for example. A shape data input unit 10 acquires three-dimensional shape data of the subject's foot thus measured and stores the three-dimensional shape data in a shape data storage unit 20. The shape data storage unit 20 stores three-dimensional shape data of the subject's foot related to attribute information, such as the gender, age, and race, of the subject.

A characteristic extraction unit 30 extracts foot shape characteristics from the three-dimensional shape data of the subject's foot stored in the shape data storage unit 20, and stores the foot shape characteristics in a shape characteristic storage unit 40.

FIGS. 2A-2G are diagrams used to describe foot shape characteristics. Referring to FIGS. 2A-2G, there will be described examples of the foot shape characteristics extracted by the characteristic extraction unit 30 from the three-dimensional shape data of a foot. However, the foot shape characteristics are not limited to the examples.

Figure 2A:
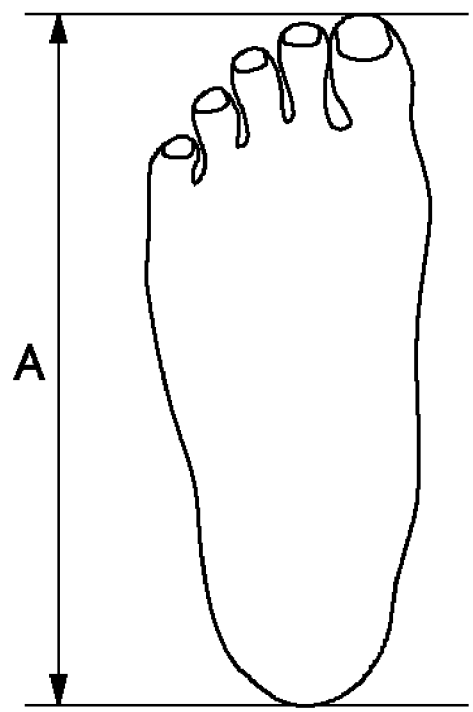
FIGS. 2A-2G are diagrams used to describe foot shape characteristics.
Figure 2B:
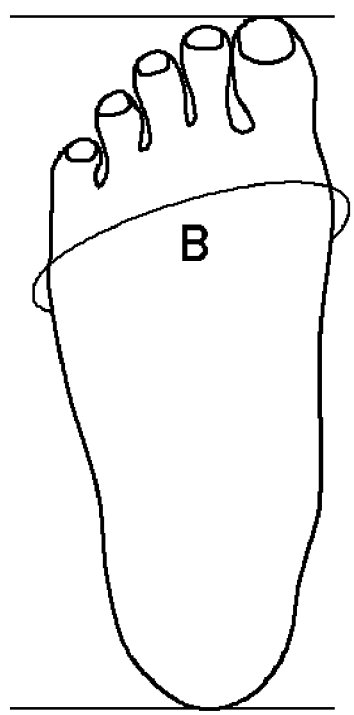
Figure 2C:
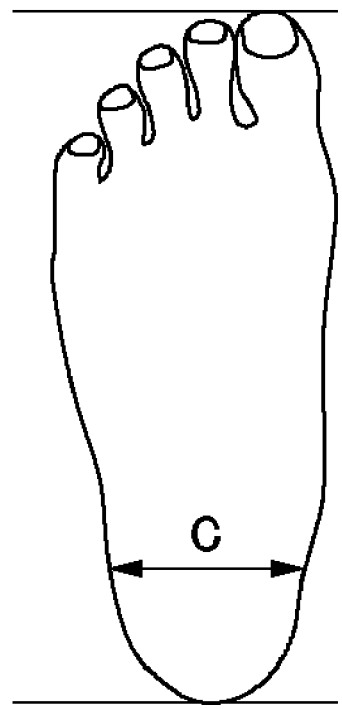
Figure 2D:
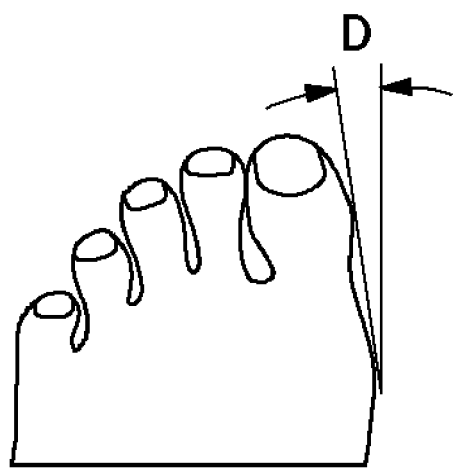
Figure 2E:
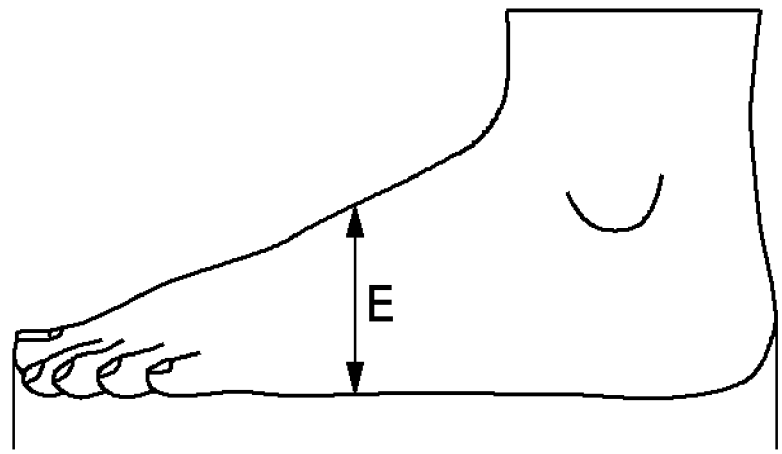
Figure 2F:
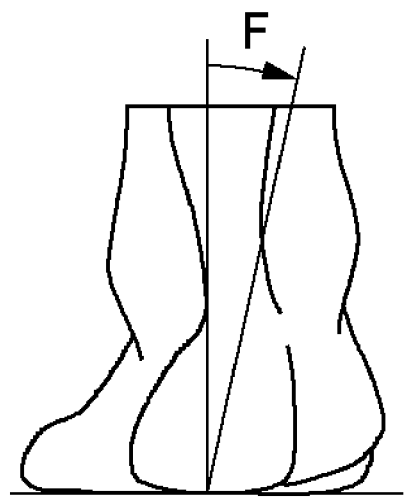
Figure 2G:
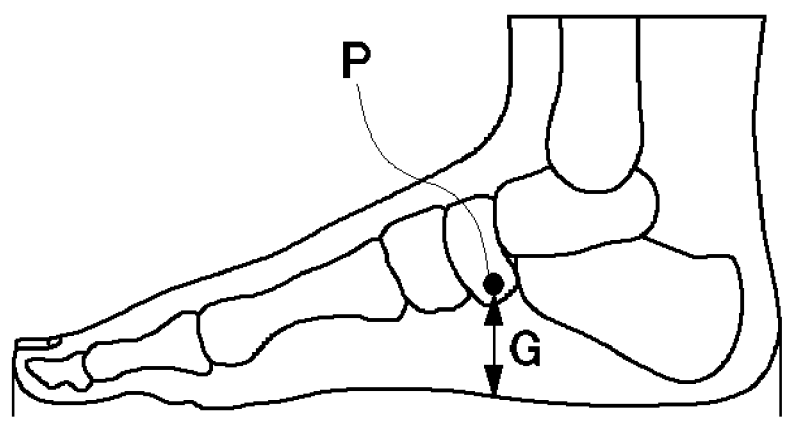

FIG. 2A illustrates foot length A. FIG. 2B illustrates ball girth B. FIG. 2C illustrates heel width C. FIG. 2D illustrates a first phalangeal angle D. FIG. 2E illustrates foot height E. FIG. 2F illustrates a heel inclination angle F. FIG. 2G illustrates arch height G.

The foot length A is the length from the heel to the tip of the longest toe of a foot. The ball girth B is the circumference around rounded portions at the bases of the first toe (hallux) and the fifth toe (little toe). The heel width C is the width of a heel portion on the sole. The first phalangeal angle D is a curving angle of the first toe (hallux) toward the fifth toe (little toe). The foot height E is the height of the instep measured at a position located forward of the arch. The heel inclination angle F is an inclination angle of the inner side with respect to the outer side of the heel. The arch height G is the height of the arch, i.e., the height of a most outwardly bulging part P of the navicular bone from the plantar surface.

Among the seven shape characteristics of the foot length A, ball girth B, heel width C, first phalangeal angle D, foot height E, heel inclination angle F, and arch height G, the foot length A, heel width C, first phalangeal angle D, and foot height E can be measured based on two-dimensional shape data of a foot. For the other shape characteristics, three-dimensional shape data of the foot is needed. Using three-dimensional shape data measured without attaching a marker to a subject, the six shape characteristics of the foot length A, ball girth B, heel width C, first phalangeal angle D, foot height E, and heel inclination angle F can be measured with a certain degree of accuracy. However, since the position of the navicular bone cannot be easily identified from the outer shape of the foot, it has been difficult to calculate the arch height G based on three-dimensional shape data measured without using markers.

With regard to the most outwardly bulging part P of the navicular bone illustrated in FIG. 2G, a measurer needs to palpate to find its position. The navicular bones of some people may not outwardly bulge and may often be unable to be identified from the outer shapes of the feet. With a conventional foot shape measuring instrument, a measurer needs to find the most outwardly bulging part P of the navicular bone and attach a marker thereto. Meanwhile, with a markerless foot size estimation method of the present embodiment, the arch height can be accurately estimated based on foot shape characteristics, without attaching a marker to the bulging part of the navicular bone.

Figure 3:
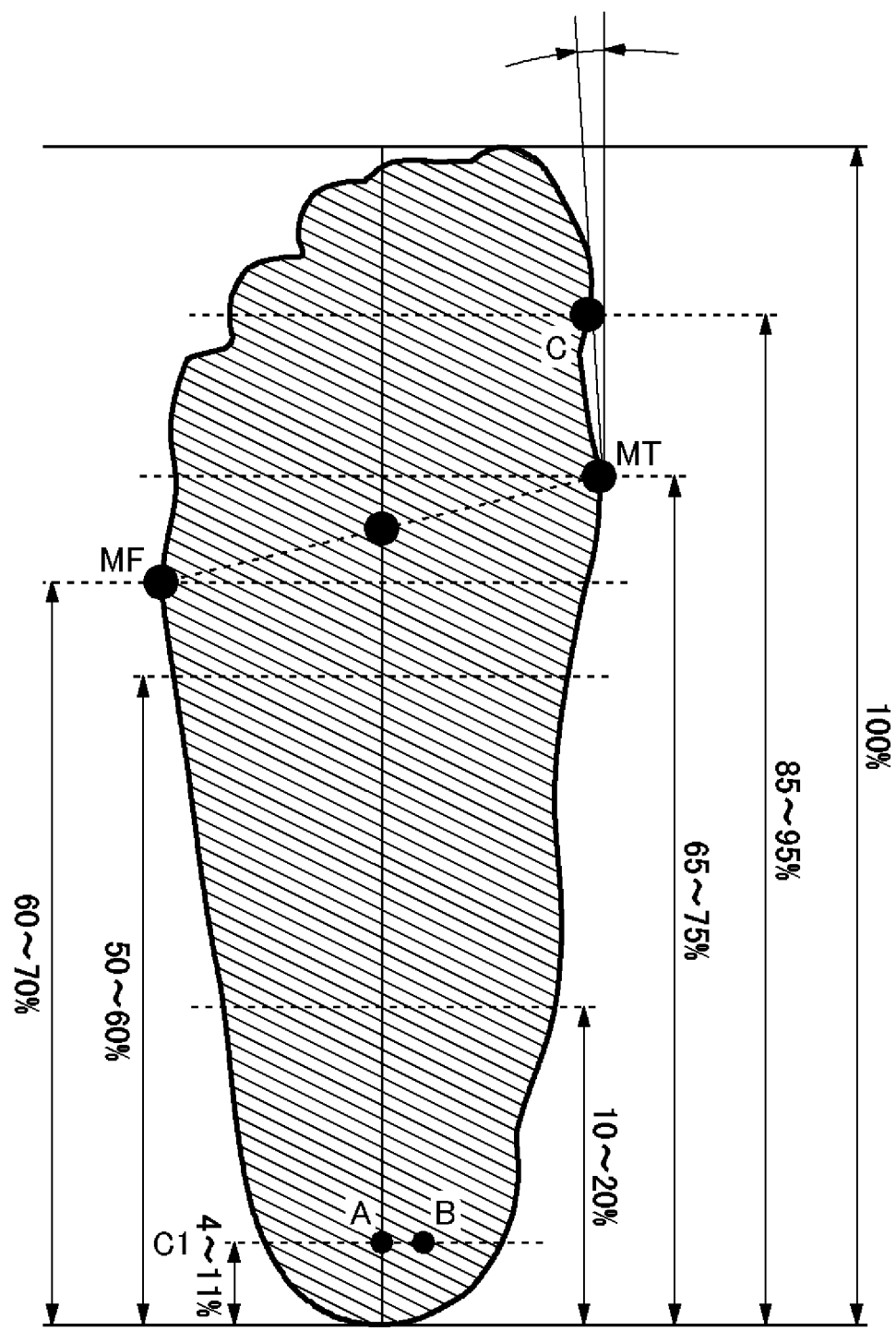
FIG. 3 is a diagram used to describe specific calculation methods for the foot shape characteristics.

Referring to FIG. 3, there will be described specific calculation methods for the seven shape characteristics of the foot length A, ball girth B, heel width C, first phalangeal angle D, foot height E, heel inclination angle F, and arch height G.

(A) Foot Length

The longer axis of a foot is generally inclined with respect to the vertical axis of a scanner coordinate system. Accordingly, the longer axis of the foot is determined before the foot length is obtained based on the difference between the maximum value and the minimum value in the longer axis direction.

1. Extract the contour of the foot shape viewed from the top.
2. In a range between the maximum value and the minimum value in the vertical axis direction of the scanner coordinate system, obtain a lateral point MF on the contour at a position of 60-70% of the range from the pternion, which is the rearmost end of the heel, obtain a medial point MT on the contour at a position of 65-75% of the range from the pternion, and obtain the midpoint between the lateral point MF and the medial point MT.
3. Define the straight line connecting the pternion and the midpoint as the longer axis of the foot, and calculate, as the foot length, the difference between the maximum value and the minimum value on the longer axis.

(B) Ball Girth

1. Cut along a cross section that includes the medial point MT and the lateral point MF and that is perpendicular to a horizontal plane.
2. Select a point cloud (point group data) located within a certain minute distance from the cross section.
3. Project the selected point cloud onto the cross section.
4. Calculate, as the ball girth, the length of the curved line smoothly connecting the points in the point cloud projected onto the cross section.

(C) Heel Width

1. Cut along a cross section at a position of 10-20% of the range from the pternion in the longer axis direction of the foot.
2. Calculate, as the heel width, the difference between the maximum value and the minimum value in the shorter axis direction.

(D) First Phalangeal Angle

1. Obtain a medial point C on the contour at a position of 85-95% of the range from the pternion in the longer axis direction of the foot.
2. Calculate, as the first phalangeal angle, the angle between the longer axis direction and a straight line that passes through the medial point MT at the position of 65-75% of the range and the medial point C at the position of 85-95% of the range.

(E) Foot Height

1. Cut along a cross section at a position of 50-60% of the range from the pternion in the longer axis direction of the foot.
2. Obtain, as the foot height, the maximum value in the height direction within the cross section.

(F) Heel Inclination Angle

1. Cut along a cross section Cl at a position of 4-11% of the range from the pternion in the longer axis direction of the foot.
2. Obtain the midpoint of the intersection of the cross section Cl and a horizontal line at a height position of 20-30% from the plantar surface, and define the midpoint as a point A.
3. Obtain the foot of a perpendicular drawn from the pternion on a horizontal line at a height position of 0-10% from the plantar surface, and define the foot of the perpendicular as a point B.
4. Calculate, as the heel inclination angle, the angle between a vertical direction and the straight line AB.

(G) Arch Height

Based on the gathered three-dimensional shape data of a foot, a multiple regression equation is created in which the arch height is set as the objective variable, and at least one of the foot height, ball girth, heel width, heel inclination angle, first phalangeal angle, and foot length is set as an explanatory variable. By performing multiple regression analysis, the arch height is calculated.

FIG. 1 is referred to again. A machine learning unit 50 uses, as teacher data, the foot shape characteristics and arch height stored in the shape characteristic storage unit 40 to create, through machine learning, an estimation model used to estimate arch height based on foot shape characteristics, and stores the estimation model in an estimation model storage unit 60.

The teacher data includes the foot shape characteristics as illustrated in FIGS. 2A-2G, and also includes arch height in the form of a measurement result obtained using a given method. For the arch height to be given as teacher data, a measurement result obtained by means of a foot shape measuring instrument using markers may be used. The machine learning unit 50 uses the shape characteristics including the arch height as teacher data to create, through machine learning, an estimation model used to estimate arch height based on foot shape characteristics other than arch height.

In the machine learning, for example, a regression equation used to obtain arch height from foot shape characteristics other than arch height using multiple regression analysis is considered, and the coefficients and the constant term in the regression equation are learned. As the foot shape characteristics other than arch height, one or more of the six shape characteristics of the foot length A, ball girth B, heel width C, first phalangeal angle D, foot height E, and heel inclination angle F illustrated in FIGS. 2A-2F may be appropriately used in combination. Among the six shape characteristics, any one shape characteristic may be used to estimate the arch height, or an arbitrary number of shape characteristics may be used in combination to estimate the arch height.

There will now be described an example of the regression equation used to obtain the arch height G, in which the foot length A, ball girth B, heel width C, first phalangeal angle D, foot height E, and heel inclination angle F are used as independent variables. In the regression equation, a, b, c, d, e, and f are coefficients of the respective independent variables, and h is a constant term.

Through experiments using the foot shape characteristics of a large number of subjects, it has been found that, when the arch height is obtained from the regression equation, the six independent variables of the foot length A, ball girth B, heel width C, first phalangeal angle D, foot height E, and heel inclination angle F are classified into three groups. Each of the coefficients of the six independent variables could vary in magnitude, depending on the attributes, such as the gender, age, and race, of the subject. In this case, the magnitude relationship between the coefficient values of independent variables in the same group may change depending on an attribute, but the magnitude relationship between the coefficient values of independent variables in different groups does not change depending on an attribute. More specifically, when an attribute is changed, the magnitude relationship between the coefficient values of independent variables in the same group may change; however, between two arbitrary groups, if the coefficient value of an arbitrary independent variable in the first group is larger than the coefficient value of an arbitrary independent variable in the second group, such a magnitude relationship will not change even when an attribute is changed. Accordingly, with such classified groups, an independent variable with a higher degree of contribution can be selected, irrespective of the attributes.

The machine learning unit 50 performs pre-processing of classifying the foot shape characteristics into groups such that the magnitude relationship between the coefficient values of independent variables in different groups does not change depending on an attribute of the subject. Accordingly, the machine learning unit 50 sets groups unrelated to an attribute of the subject and learns the coefficient values of independent variables in each group. The machine learning unit 50 then stores, in the estimation model storage unit 60, the learned results in the form of a table containing the coefficient values of independent variables related to each group, for example.

As such groups, for example, groups A, B, and C may be set by classification, in which the group A includes the foot height E, the group B includes the ball girth B and heel width C, and the group C includes the heel inclination angle F, first phalangeal angle D, and foot length A. It has been found that the groups A, B, and C contribute to the estimation of arch height more greatly in this order, and the degree of contribution of the group A (i.e., foot height E) is particularly high. It has been also found that a combination of at least one of the ball girth B and the heel width C, which belong to the group B, and the foot height E improves accuracy of arch height estimation. More specifically, when the arch height was estimated only based on the foot height A, the explanatory rate was about 58%. With a combination of the foot height E and least one of the ball girth B and the heel width C, however, the explanatory rate was about 61-61.5%, improved by about 3-3.5%. Further, it has been also found that, when at least one of the heel inclination angle F, first phalangeal angle D, and foot length A, which belong to the group C, is further added, a secondary effect for further improvement of accuracy of arch height estimation can be obtained. More specifically, when at least one of the heel inclination angle F, first phalangeal angle D, and foot length A was further added, the explanatory rate was about 62-62.5%, further improved by about 0.5-1%. The classification into three groups is merely an example, and, as long as the magnitude relationship between the coefficient values of independent variables in different groups does not change, various modifications may be developed for the group classification. As an example, arch height is estimated using the following regression equation.

Arch height G=e*Foot height E+b*Ball girth B+c*Heel width C+f*Heel inclination angle F+d*First phalangeal angle D+a*Foot length A+h The standard partial regression coefficients obtained from the three-dimensional shape data of the subjects' feet are specifically as follows.

Coefficient e of foot height E:
preferably 0.5 to 1, more preferably 0.7 to 0.9
Coefficient b of ball girth B
preferably −0.4 to 0, more preferably −0.2 to 0
Coefficient c of heel width C:
preferably −0.4 to 0, more preferably −0.2 to 0
Coefficient f of heel inclination angle F
preferably −0.3 to 0, more preferably −0.1 to 0
Coefficient d of first phalangeal angle D
preferably −0.3 to 0, more preferably −0.1 to 0
Coefficient a of foot length A:
preferably 0 to 0.3, more preferably 0 to 0.1

The machine learning unit 50 learns the coefficients and constant term in the regression equation based on the teacher data, and stores, as an estimation model, the coefficients and constant term thus learned in the estimation model storage unit 60.

An estimation output unit 70 uses the estimation model stored in the estimation model storage unit 60 to estimate arch height based on the shape characteristics extracted from the three-dimensional shape data of a subject's foot, and outputs the arch height.

There has been described the case where the same regression equation is used for every subject. However, multiple regression equations may be prepared for the respective attributes, such as the gender, age, and race, of the subjects. For example, two separate regression equations may be prepared for males and females, and one of the regression equations may be selected and used depending on the gender of the subject. Further, multiple regression equations may be prepared for different ages and races, and a regression equation may be appropriately selected and used depending on the gender, age, and race of the subject. In this case, the machine learning unit 50 learns a regression equation for each attribute of subjects and stores the regression equation in the estimation model storage unit 60. The estimation output unit 70 then selects a regression equation to use, based on the attribute information of the subject. Characteristics of the foot skeleton are different depending on the attributes of the subject. Accordingly, appropriately selecting and using a regression equation for each attribute, and learning the coefficients in the regression equation for each attribute can improve the estimation accuracy.

FIG. 4 is a flowchart that shows a procedure for creating, through machine learning, an estimation model used to estimate arch height based on foot shape characteristics. This procedure corresponds to a machine learning phase in which the machine learning unit 50 creates an estimation model using foot shape characteristics of a large number of subjects.

The shape data input unit 10 acquires three-dimensional shape data of a foot of a subject (S10). In the machine learning phase, the shape data input unit 10 may use three-dimensional shape data of a foot gathered by using a foot shape measuring instrument with which measurement is performed with markers attached to the subject. In the foot shape measurement using the markers, a measurement value of arch height is also obtained. Also, to provide a more accurate measurement value of arch height as teacher data, a measurer may actually measure the arch height of the subject and enter the arch height into the shape data input unit 10.

The characteristic extraction unit 30 extracts foot shape characteristics necessary for the estimation of arch height, from the three-dimensional shape data of the subject's foot (S20). More specifically, the characteristic extraction unit 30 extracts foot shape characteristics used as independent variables in a regression equation as described previously. For example, when the arch height G is estimated using a regression equation in which the foot height E and the ball girth B are used as independent variables, the foot height E and the ball girth B are extracted. In the machine learning phase, arch height needs to be provided as teacher data. Accordingly, the characteristic extraction unit 30 may extract the arch height from the three-dimensional shape data of the subject's foot, or may use the arch height entered by the measurer.

The machine learning unit 50 uses the foot shape characteristics and the arch height as teacher data to create, through machine learning, an estimation model used to estimate arch height based on foot shape characteristics other than arch height (S30). For example, when a regression equation is used in which the foot height E and the ball girth B are used as independent variables, the foot height E, the ball girth B, and the arch height G are used as teacher data to determine the coefficients e and b of the independent variables and the constant term h in the regression equation.

FIG. 5 is a flowchart that shows a procedure for estimating arch height based on extracted foot shape characteristics, by using an estimation model. This procedure corresponds to an estimation phase in which the estimation output unit 70 estimates the arch height of a subject based on foot shape characteristics of the subject by using an estimation model created by the machine learning unit 50.

The shape data input unit 10 acquires three-dimensional shape data of a foot of a subject (S40). In the estimation phase, the three-dimensional shape data measured without attaching markers to the subject's foot is used.

The characteristic extraction unit 30 extracts, from the three-dimensional shape data of the subject's foot, foot shape characteristics other than arch height to estimate arch height (S50). More specifically, the characteristic extraction unit 30 extracts foot shape characteristics used as independent variables in a regression equation as described previously. For example, when the arch height G is estimated using a regression equation in which the foot height E and the ball girth B are used as independent variables, the foot height E and the ball girth B are extracted.

The estimation output unit 70 estimates arch height of the subject based on the foot shape characteristics of the subject by using an estimation model created by the machine learning unit 50 (S60). For example, when the arch height G is estimated using a regression equation in which the foot height E and the ball girth B are used as independent variables, the foot height E and the ball girth B of the subject extracted as foot shape characteristics are substituted into the regression equation to obtain the arch height G.

There will now be described the effects obtained by using the markerless foot size estimation method of the present embodiment to estimate the arch height. Experiments have shown that the explanatory rate of arch height estimated by using the abovementioned regression equation was about 58-63%. The explanatory rate (also called the "coefficient of determination" or "contribution rate") is an index indicating explanatory power of an estimated value of an objective variable with respect to an observed value of the objective variable in regression analysis. The explanatory rate is given by the square of a correlation coefficient in regression analysis. When the explanatory rate is greater than 50%, the correlation coefficient is 0.7 or greater. Accordingly, the estimation of arch height based on regression analysis described in the present embodiment is shown to have a sufficient degree of accuracy.

Although a regression equation is used as an estimation model in the abovementioned embodiment, machine learning other than regression analysis may also be used. For example, decision tree analysis, a neural network, or Bayesian estimation may be used. Also, besides the foot shape characteristics, pieces of attribute information, such as the gender, age, and race, of the subject may also be used in combination as the teacher data in the machine learning.

As described above, with the markerless foot size estimation device 100 of the present embodiment, arch height can be accurately measured without using markers. It has been conventionally difficult to obtain arch height based on characteristics extracted from three-dimensional shape data measured without using markers. With the markerless foot size estimation device 100 of the present embodiment, on the other hand, an estimation model is created through machine learning to estimate arch height based on foot shape characteristics, so that arch height can be estimated based on the foot shape characteristics of the subject by using the estimation model. Using the estimation model eliminates the need for attachment of markers, thereby saving time and effort for the operation and reducing the measurement time. Also, positional errors of markers attached by a measurer will not be caused, so that arch height can be measured more accurately.

The present invention has been described with reference to an embodiment. The embodiment is intended to be illustrative only, and it will be obvious to those skilled in the art that various modifications to a combination of constituting elements or processes could be developed and that such modifications also fall within the scope of the present invention.

In the markerless foot size estimation method of the abovementioned embodiment, arch height is estimated based on foot shape characteristics other than arch height. The markerless foot size estimation method of the present embodiment may also be used to estimate an arbitrary index other than arch height based on foot shape characteristics.

INDUSTRIAL APPLICABILITY

The present invention is applicable to a technology for estimating arch height.

REFERENCE SIGNS LIST 10 shape data input unit
20 shape data storage unit
30 characteristic extraction unit
40 shape characteristic storage unit
50 machine learning unit
60 estimation model storage unit
70 estimation output unit
100 markerless foot size estimation device

The invention claimed is:

1. A markerless foot size estimation device, comprising:
an extraction unit that extracts shape characteristics of a foot from three-dimensional shape data of a foot of a subject without a marker attached to a position corresponding to a navicular head; and
an output unit that estimates, using an estimation model obtained through machine learning using as teacher data the shape characteristics and arch height of the foot of the subject, the arch height based on the extracted shape characteristics and outputs the arch height,
wherein the shape characteristics include foot height of the foot of the subject.

2. The markerless foot size estimation device of claim 1, wherein the shape characteristics further include at least one of ball girth and heel width of the foot of the subject.

3. The markerless foot size estimation device of claim 2, wherein the shape characteristics further include at least one of a heel inclination angle, a first phalangeal angle, and foot length of the foot of the subject.

4. A markerless foot size estimation method, comprising:
extracting shape characteristics of a foot from three-dimensional shape data of a foot of a subject without a marker attached to a position corresponding to a navicular head; and
estimating, using an estimation model obtained through machine learning using as teacher data the shape characteristics and arch height of the foot of the subject, the arch height based on the extracted shape characteristics and outputting the arch height,
wherein the shape characteristics include foot height of the foot of the subject.

5. A markerless foot size estimation program comprising computer-implemented modules including:
a module that extracts shape characteristics of a foot from three-dimensional shape data of a foot of a subject without a marker attached to a position corresponding to a navicular head; and
a module that estimates, using an estimation model obtained through machine learning using as teacher data the shape characteristics and arch height of the foot of the subject, the arch height based on the extracted shape characteristics and outputs the arch height,
wherein the shape characteristics include foot height of the foot of the subject.

* * * * *